US006156419A

United States Patent [19]

Brugger et al.

[11] Patent Number: 6,156,419

[45] Date of Patent: Dec. 5, 2000

[54] RECORDING SHEETS FOR INK JET PRINTING

[75] Inventors: Pierre-Alain Brugger, Ependes; Juergen Ketterer, Marly; Rolf Steiger, Praroman; Felix Zbinden, Plasselb, all of Switzerland

[73] Assignee: Iford Imaging Switzerland GmbH, Switzerland

[21] Appl. No.: 09/069,924

[22] Filed: Apr. 30, 1998

[30] Foreign Application Priority Data

May 2, 1997 [CH] Switzerland ............................ 1028/97

[51] Int. Cl.$^{7}$ ................................ B41M 5/00; C08K 3/22

[52] U.S. Cl. .................................... 428/304.4; 428/307.3; 428/312.8; 428/328; 428/329; 347/105; 524/450

[58] Field of Search .............................. 428/304.4, 307.3, 428/312.2, 312.8, 317.1, 323, 328, 329, 523, 532; 347/105; 524/450

[56] References Cited

U.S. PATENT DOCUMENTS

| | | | |
|---|---|---|---|
| 2,240,472 | 4/1941 | Swan | 95/7 |
| 2,271,623 | 2/1942 | Carroll | 95/7 |
| 5,397,758 | 3/1995 | Boureutaubertot et al. | 502/303 |
| 5,573,582 | 11/1996 | Inui et al. | 106/287.17 |
| 5,855,655 | 1/1999 | Nohr et al. | 106/31.27 |
| 5,891,229 | 4/1999 | Nohr et al. | 106/31.49 |

FOREIGN PATENT DOCUMENTS

| | | |
|---|---|---|
| 0298424A2 | 1/1989 | European Pat. Off. . |
| 0407720A1 | 1/1991 | European Pat. Off. . |
| 0497 071 A1 | 8/1992 | European Pat. Off. . |
| 0622244A1 | 4/1994 | European Pat. Off. . |
| 0691 210 A1 | 1/1996 | European Pat. Off. . |
| 0698499A1 | 2/1996 | European Pat. Off. . |
| 0736491A2 | 10/1996 | European Pat. Off. . |
| 60-245588 | 12/1985 | Japan . |
| 4-323075 | 11/1992 | Japan . |
| WO 95/28285 | 10/1995 | WIPO . |

OTHER PUBLICATIONS

Engels, et al., Z. anorg. allg. Chem. 621, 381–387 (1995) (No Month).

*Primary Examiner*—Marie Yamnitzky
*Attorney, Agent, or Firm*—Dara L. Onofrio, Esq.

[57] ABSTRACT

A recording sheet for ink jet printing is described consisting of a support onto which is coated at least one ink receiving layer, said recording sheet being characterized in that at least one coated layer comprises a porous aluminium oxide/hydroxide containing at least one element of the rare earth metal series of the periodic system of the elements with atomic numbers 57 to 71.

11 Claims, No Drawings

RECORDING SHEETS FOR INK JET PRINTING

FIELD OF THE INVENTION

This invention relates to recording sheets suitable for use in an ink jet printing process and to coating compositions for the preparation of ink receiving layers for this process. It relates especially to recording sheets where the image recorded thereon can be observed by both reflected or transmitted light, where the ink receiving system consists of a support onto which is coated at least one ink receiving layer, said recording sheet being characterised in that at least one coated layer contains a porous inorganic compound.

BACKGROUND OF THE INVENTION

Recording sheets for the ink jet printing process available today do not have all the properties required, particularly there is an urgent need to improve ink absorptiveness, ink absorption rate, image quality, water fastness and light stability. A preferred embodiment of the invention relates to improved recording sheets having excellent image quality, high ink absorptiveness and high ink absorption rate. In particular ink receiving materials are sought where the images recorded thereon are resistant to rubbing on the surface and remain intact when in contact with water and should not fade when exposed to light.

Ink jet printing processes are of two types: continuous stream and drop-on-demand.

In continuous stream ink jet printing systems, ink is emitted in a continuous stream under pressure through a nozzle. The stream is perturbed, causing it to break up into droplets at a fixed distance from the nozzle. At the break-up point, the droplets are charged in accordance with digital data signals and passed through an electric static field which adjusts the trajectory of each droplet in order to direct it to a gutter for recirculation or a specific location on a recording medium.

In the non-continuous process, or the so called "drop-on-demand" systems, a droplet is expelled from a nozzle to a position on a recording medium in accordance with digital data signals. A droplet is not formed or expelled unless it is to be placed on the recording medium.

The invention is directed towards recording sheets and coating compositions that may be used in both recording processes.

It is known that recording sheets for ink jet printing must meet a number of stringent demands. The printed image has to fulfill the following properties:

High resolution

High colour density

Good colour reproduction

High resistance to rubbing

Good water fastness

High light stability

The following conditions have to be met to fulfill these goals:

1. The ink needs to be absorbed quickly into the recording material.
2. The jetted ink droplets have to spread circularly on the recording material and have to form well defined edges.
3. Dye diffusion in the recording material has to be low so that the diameter of the colour points is not increased more than necessary.
4. An ink droplet is not allowed to interfere with a droplet deposited earlier nor should it blur it.
5. The recording material needs to have a surface that gives high colour density and brilliance.
6. The recording material has to show excellent physical properties before and after printing.

These requirements are partially contradictory, for example a quick ink absorption rate often results in bad resistance to rubbing of the surface.

Starting from these requirements for a recording material ways are looked for that will result in images showing high colour density together with high resistance towards rubbing of the surface. The best properties are achieved with recording materials having coated an ink receiving layer on a support.

Patents EP 0,298,424 and EP 0,407,720, patent applications EP 0,622,244 and JP 60-245,588 describe ink receiving layers including as pigment aluminium oxide/hydroxide with a pseudo-bohemite structure. Pseudo-bohemite is an agglomerate of aluminium oxide/hydroxide of formula $Al_2O_3$.n $H_2O$ where n is from 1 to 1.5. Preferentially this aluminium oxide/hydroxide with a pseudo-bohemite structure is used in the form of its colloidal solution, because only in this way recording materials with superior image quality are obtained. It is well known that such colloidal solutions are only stable at low concentrations of the active ingredient. The storage stability of such colloidal solutions is low and storage conditions have to be tightly controlled.

Ink receiving layers prepared with aluminium oxide/hydroxide isolated in its solid form from its colloidal solution give images after ink jet printing with a reduced image quality compared with ink receiving layers prepared with the same aluminium oxide/hydroxide in the form of its colloidal solution.

Colloidal solutions of aluminium oxide/hydroxide may be prepared for example by neutralising aluminium salts followed by ageing as described in patent application JP 60-245,588. Another possibility is the hydrolysis of aluminium alkoxides as described for example in patent application EP 0,736,491.

Recording sheets for ink jet printing are described for example in patent applications EP 0,622,244 and EP 0,698,499 where the recording sheets comprise aluminium oxide/hydroxide containing titanium dioxide from 0.01% to 1.0% and where this modified aluminium oxide/hydroxide is used in its solid form.

The image quality of recording materials prepared in this way is however not sufficient for today's requirements.

SUMMARY OF THE INVENTION

Accordingly an object of the present invention is to provide recording sheets for use in ink jet recording which have high ink absorptiveness, high ink absorption rate and an excellent image quality.

A further objective is to provide recording materials giving excellent image quality with the wide variety of ink jet printers available on the market today.

Still an other objective of the present invention is to provide recording materials comprising at least one layer with a porous inorganic compound, where the porous inorganic solid is used in its solid form.

The invention proposes to achieve these objectives by providing a recording material comprising in at least one layer an aluminium oxide/hydroxide characterised in that it contains from 0.04 to 4.2 mole percent of one or more elements of the rare earth metal series of the periodic system of the elements with atomic numbers 57 to 71 relative to $Al_2O_3$.

Preferred are the elements lanthanum, ytterbium, cerium, neodymium or praseodymium, especially preferred are lanthanum, cerium or ytterbium or mixtures thereof.

Preferentially the aluminium oxide/hydroxide contains the elements of the rare earth metal series of the periodic system of the elements with atomic numbers 57 to 71 in an amount of from 0.4 to 2.5 mole percent relative to $Al_2O_3$.

A specially preferred aluminium oxide/hydroxide is pseudo-bohemite, an agglomerate of aluminium oxide/hydroxide of formula $Al_2O_3.n\ H_2O$ where n is from 1 to 1.5.

The ink receiving layers contain one or more binders.

Preferred binders are gelatine or polyvinyl alcohol or mixtures thereof in a quantity of preferentially 5 to 50 weight percent relative to the modified aluminium oxide/hydroxide.

Especially preferred are film forming polymers.

The ink receiving layers may contain in addition a crosslinking agent for the binder as well as fillers, natural or synthetic polymers or other compounds well known to someone skilled in the art to improve the pictorial or physical properties of the image as for example UV absorbers, optical brighteners, light stabilisers, antioxidants, humefactants, spacing agents, and so on.

The invention will be described in detail in the following description.

DETAILED DESCRIPTION OF THE INVENTION

The invention describes the use of aluminium oxide/hydroxide in recording sheets for ink jet printing characterised in that it contains from 0.04 to 4.2 mole percent of one or more elements of the rare earth metal series of the periodic system of the elements with atomic numbers 57 to 71 relative to $Al_2O_3$.

In a preferred embodiment of the invention the aluminium oxide/hydroxide contains from 0.4 to 2.5 mole percent of one or more elements of the rare earth metal series of the periodic system of the elements with atomic numbers 57 to 71 relative to $Al_2O_3$.

In a specially preferred embodiment of the invention the aluminium oxide/hydroxide contains the elements lanthanum, ytterbium, cerium, neodymium or praseodymium, especially preferred are lanthanum, cerium or ytterbium or mixtures thereof.

Especially preferred as aluminium oxide/hydroxide is pseudo-bohemite, an agglomerate of aluminium oxide/hydroxide of formula $Al_2O_3.n\ H_2O$ where n is from 1 to 1.5.

This aluminium oxide/hydroxide modified with the above mentioned chemical elements may be prepared by similar methods as described for example in Zeitschrift für anorganische Chemie 621, 381 (1995). In another preparation method aluminium oxide/hydroxide is mixed in aqueous solution at a temperature between 20° C. and 95° C. with a solution of a salt of the rare earth metal series, filtered, washed and dried.

Aluminium oxide/hydroxide modified in this way has been used up to now as an adsorbent for gases and as carrier for catalysts and ceramics. Its physicochemical properties differ considerably from those of the starting material.

We have discovered now unexpectedly that these compounds give excellent ink receiving layers for recording materials for ink jet printing when incorporated into a layer with one ore more binders. These binders normally are water soluble polymers. Especially preferred are film forming polymers.

These water soluble polymers may include for example natural polymers or modified products thereof such as albumin, gelatine, casein, starch, gum arabicum, sodium or potassium alginate, hydroxyethylcellulose, carboxymethylcellulose, α-, β- or γ-cyclodextrine and the like. In the case where one of the water soluble polymers is gelatine, all known types of gelatine may be used as for example acid pigskin or limed bone gelatine, acid or base hydrolysed gelatine, but also derivatised gelatines like for instance phthalaoylated, acetylated or carbamoylated gelatine or gelatine derivatised with the anhydride of trimellytic acid. A preferred natural binder is gelatine.

Synthetic polymers are also used and include polyvinyl alcohol; completely or partially saponified products of copolymers of vinyl acetate and other monomers; homopolymers of or copolymers with monomers of unsaturated carboxylic acids such as (meth)acrylic acid, maleic acid, crotonic acid and the like; homopolymers of or copolymers with vinyl monomers of sulfonated vinyl monomers such as vinylsulfonic acid, styrene sulfonic acid and the like. Furthermore homopolymers of or copolymers with vinyl monomers of (meth)acrylamide; homopolymers or copolymers of other monomers with ethylene oxide; polyurethanes; polyacrylamides; water soluble nylon type polymers; polyvinyl pyrrolidone; polyesters, polyvinyl lactams; acrylamide polymers; substituted polyvinyl alcohol; polyvinyl acetals; polymers of alkyl and sulfoalkyl acrylates and methacrylates; hydrolysed polyvinyl acetates; polyamides; polyvinyl pyridines; polyacrylic acid; copolymers with maleic anhydride; polyalkylene oxides; methacrylamide copolymers and maleic acid copolymers can be used. All these polymers can also be used as mixtures. A preferred synthetic binder is polyvinyl alcohol.

These polymers can be blended with non water soluble natural or synthetic high molecular compounds, particularly with acrylate latices or with styrene acrylate latices.

Although not specifically claimed in this invention non water soluble polymers are nevertheless considered part of the system.

The polymers mentioned above having groups with the possibility to react with a crosslinking agent can be crosslinked or hardened to form essentially non water soluble layers. Such crosslinking bonds may be either covalent or ionic. Crosslinking or hardening of the layers allows for the modification of the physical properties of the layers, like for instance in water absorbtiveness of the layer or in resistance against physical damage.

The crosslinking agents or hardeners are selected depending on the water soluble polymers used.

Organic crosslinking agents and hardeners include for example aldehydes (such as formaldehyde, glyoxal or glutaraldehyde), N-methylol compounds (such as dimethylol urea or methylol dimethylhydantoin), dioxane derivatives (such as 2,3-dihydroxy dioxane), reactive vinyl compounds (such as 1,3,5-trisacrylolyl hexahydro-s-triazine or bis-(vinylsulfonyl)methyl ether), active halogen compounds (such as 2,4-dichloro-6-hydroxy-s-triazine), epoxydes, aziridines, carbamoyl pyridinium compounds or mixtures of two or more of the above mentioned crosslinking agents.

Inorganic crosslinking agents or hardeners include for example chromium alum, aluminium alum or boric acid.

The layers may also contain reactive compounds that crosslink the layers under the influence of UV light, electron beams, X-ray beams or heat.

The layers can be modified by the addition of fillers. Possible fillers are for instance kaolin, talcum, Ca- or Ba-carbonates, silica, titanium dioxide, bentonite, zeolite, aluminium silicate, calcium silicate or colloidal silicium dioxide. Likewise the possibility exists to use organic inert particles such as polymer beads. These beads may consist of polyacrylates, polyacrylamides, polystyrene or different copolymers of acrylates and styrene. The fillers are selected according to the intended use of the printed images. Some of these compounds cannot be used if the printed images are to be used as transparencies. Alternatively they are of interest in cases where the printed images are to be used as remission pictures. Often the introduction of such filler causes a wanted matte surface.

The recording materials may further contain in addition to the modified aluminium oxide/hydroxide water soluble metal salts, as for example salts of the alkaline earth's or salts of the rare earth metal series.

The image recording sheets of the invention comprise a support with at least one ink receiving layer coated thereon. A wide variety of such supports are known and commonly employed in the art. They include all those supports used in the manufacture of photographic materials. This includes clear films made from cellulose esters such as cellulose triacetate, cellulose acetate, cellulose propionate or cellulose acetate butyrate, polyesters such as poly(ethylene terephthalate), polyamides, polycarbonates, polyimides, polyolefins, poly(vinyl acetals), polyethers, polyvinyl chloride and polysulfonamides. Polyester film supports, and especially poly(ethylene terephthalate) are preferred because of their excellent dimensional stability characteristics.

The usual supports used in the manufacture of opaque photographic material can be used including for example baryta paper, polyethylene coated papers, voided polyester as for instance manufactured by ICI under the trade name of MELINEX. Especially preferred are resin coated paper or voided polyester.

When such support material, in particular polyester, is used a subbing layer is advantageously added first to improve the bonding of the ink receiving layers to the support. Useful subbing compositions for this purpose are well known in the photographic art and include for example terpolymers of vinylidene chloride, acrylonitrile and acrylic acid or of vinylidene chloride, methyl acrylate and itaconic acid.

Also used as supports are plain paper, comprising all different types of papers varying widely in their composition and in their properties. Pigmented papers and cast coated papers can be used as well as metal foils, such as foils made from alumina.

The ink receiving layers according to this invention are in general coated from aqueous solutions or dispersions containing all necessary ingredients. It is in many cases necessary to add surfactants to those coating solutions or dispersions allowing for smooth coating and evenness of the layers. Suitable surfactants are described in many patents, for example, U.S. Pat. Nos. 2,240,472, 2,271,623, 2,288,226, 2,739,891, 2,823,123, 2,831,766, 2,944,900, 3,068,101, 3,133,816, 3,158,484, 3,210,191, 3,253,919, 3,294,540, 3,415,649, 3,441,413, 3,475,174, 3,507,660, 3,545,974, 3,589,906, 3,666,478, 3,671,247, 3,726,683, 3,754,924, 3,756,828, 3,772,021 and 3,843,368; GB patents 1,012,495, 1,022,878, 1,138,514, 1,159,825, 1,179,290, 1,198,450, 1,374,780 and 1,397,218, and BE patent 731,126.

Besides being necessary for coating purposes these compounds may have an influence on the image quality and may therefore be selected with this specific goal in mind. Although not specifically claimed in this invention surfactants nevertheless form an important part of the invention.

In addition to the above mentioned elements recording sheets as claimed in this invention may contain additional additives aimed at further improving its performance, as for example brightening agents to improve the whiteness, such as stilbenes, coumarines, triazines, oxazoles or others compounds known to someone skilled in the art.

Light stability can be improved by adding UV absorbers such as benzotriazoles, benzophenones, thiazolidones, oxazoles, thiazoles and other compounds known to someone skilled in the art. The amount of UV absorber can vary from 200–2000 mg/m$^2$, preferably from 400–1000 mg/m$^2$. The UV absorbers may be added to any of the layers of the recording sheets of the invention. It is preferred however if they are added, the UV absorbers are included in the topmost layer of the system.

It is further known that images produced by ink jetting can be protected from degradation by the addition of light stabilisers and antioxidants. Examples of such compounds are sterically hindered phenols, sterically hindered amines, chromanols and the like. The above mentioned additives can be added as aqueous solutions to the coating solutions. In the case where these compounds are not water soluble they can be incorporated into the coating solutions by other common techniques known in the art. The compounds may be for example dissolved in a water miscible solvent such as lower alcohols, glycols, ketones, esters or amides. Alternatively the compounds can be added to the coating solutions as fine dispersions, as oil emulsions, as cyclodextrine inclusion complexes or incorporated into latex particles.

Typically the receiving layers according to this invention have a thickness in the range of 0.5 to 100 micrometers dry thickness, preferably in the range of 5 to 50 micrometers.

The coating solutions or coating dispersions can be coated onto a support by any number of suitable procedures. Usual coating methods include extrusion coating, air knife coating, doctor blade coating, cascade coating or curtain coating. The coating solutions may also be applied using spray techniques. The ink receiving layers can be built up from several single layers that can be coated one after the other or simultaneously. It is likewise possible to coat a support on both sides with ink receiving layers. It is also possible to coat an antistatic layer or an anticurl layer on the backside. The method however by which the claimed ink receiving layers are produced is not to be considered limiting for the present invention.

Inks for ink jet printing consist in essence of a liquid vehicle and a dye or pigment dissolved or suspended therein. The liquid vehicle for inks employed for ink jet printing consists in general of water or a mixture of water and a water miscible organic solvent such as ethylene glycol, higher molecular weight glycols, glycerol, dipropylene glycol, polyethylene glycol, amides, polyvinyl pyrrolidone, N-methylpyrrolidone, cyclohexylpyrrolidone, carboxylic acids and their esters, ethers, alcohols, organic sulfoxides, sulfolane, dimethylformamide, dimethylsulfoxide, cellosolve, polyurethanes, acrylates and the like.

The non water parts of the ink generally serve as humefactants, cosolvents, viscosity regulating agents, ink penetration additives, levelling agents or drying agents. The organic components have in most cases a boiling point which is higher than that of water. In addition aqueous inks used for printers of the continuous flow type may contain inorganic or organic salts to increase electric conductivity. Examples of such salts include nitrates, chlorides, phosphates and salts of water soluble organic acids like acetates, oxalates and citrates. The dyes and pigments suitable for the preparation of inks useable with the recording sheets of the invention cover practically all classes of known colouring compounds. Dyes or pigments typically used for this purpose are described in EP Patent Application 0,559,324. The recording sheets according to this invention are meant to be used in conjunction with most of the inks representing the state of the art.

Other additives present in inks are for instance surfactants, optical brighteners, UV absorbers, light stabilisers, biocides and polymeric additives.

This description of the inks is for illustration only and is not to be considered as limiting for the purpose of the invention.

The following test procedures were used to evaluate and compare the recording sheets described in the present invention.

Image Homogeneity

Recording sheets according to the invention on transparent supports, as described later on in the examples, were printed with an ink jet printer EPSON STYLUS™ COLOR 500 in transparent mode using original inks. Colour patches with 11 fields were printed in each of the 7 colours cyan, magenta, yellow, black, red, green and blue, wherein the number of droplets decreases linearly from field 1 (100%) to field 10 (10%). Field 11 has a 5% droplet number. After printing the number of inhomogenous fields was counted on a lightbox. Large numbers indicate bad image quality (high number of inhomogenous fields). A zero number indicates perfect image quality, as none of the fields is inhomogenous.

Dye Bleeding

Recording sheets according to the invention on transparent supports, as described later on in the examples, were printed with an ink jet printer EPSON STYLUS™ COLOR 500 in transparent mode using original inks. Colour patches with 100% droplet numbers were printed in intimate contact. Dye bleeding was judged on the boundaries blue-yellow; green-magenta and red-cyan on a scale from 1 (extremely high dye bleeding) to 5 (no dye bleeding).

EXAMPLES

Example 1 a) Preparation of Aluminium oxide/hydroxide Modified With Lanthanum (2.2 Mole Percent Relative to $Al_2O_3$)

50 g of the aluminium oxide/hydroxide DISPERAL 100/2 (available from CONDEA GmbH, Hamburg, Germany) of formula AlOOH.n $H_2O$ (77.2% $Al_2O_3$) were dispersed for 15 minutes under vigorous mechanical stirring at a temperature of 20° C. in 948 g of doubly distilled water. Afterwards temperature was increased to 90° C. and stirring was continued for 15 minutes at this temperature. 2.04 g of $LaCl_3$ (available from Fluka Chemie AG, Buchs, Switzerland) were added as a solid and stirring was continued for 120 minutes. The solid was filtered, washed three times with doubly distilled water and dried at 110° C.

The lanthanum content in the solid was found to be 2.2 mole percent relative to $Al_2O_3$ as determined by X-ray fluorescence. The modified aluminium oxide/hydroxide showed a different temperature dependence of its conversion to $\gamma$-$Al_2O_3$ than the starting, unmodified aluminium oxide/hydroxide.

b) Preparation of Coating Solutions 8 g of the solid from example 1a) were added to a mixture of 63 g of doubly distilled water and 0.96 g of concentrated acetic acid (80%). The resulting dispersion was exposed for 3 minutes at 40° C. to ultrasound. Afterwards 8 g of a solution of polyvinyl alcohol (10% by weight, hydrolysis degree 98–99%, Molecular weight 85,000 to 146,000) (available from ALDRICH Chemie, Buchs, Switzerland) were added and the resulting coating solution was again exposed to ultrasound for 3 minutes.

c) Coating Preparation 100 g/m$^2$ of this coating solution were coated at a temperature of 40° C. onto a transparent polyester support. The coated support was then dried 60 minutes at a temperature of 30° C.

d) Image Preparation

Test images on this coating were prepared by ink jetting using the procedure previously described. The maximum transmission density was measured in the three colours yellow, magenta and cyan (for the colour patches) as well as the visual density (for the black patch).

The measured maximum densities are presented in Table 1.

TABLE 1

| | Maximum density | | | |
|---|---|---|---|---|
| Colour patch | Cyan | Magenta | Yellow | Black |
| Cyan | 1.06 | 0.25 | 0.05 | |
| Magenta | 0.05 | 0.80 | 0.20 | |
| Yellow | 0.05 | 0.05 | 1.05 | |
| Black | | | | 1.70 |
| Red | 0.05 | 0.64 | 1.14 | |
| Green | 1.00 | 0.25 | 1.00 | |
| Blue | 1.00 | 0.80 | 0.30 | |

Examples 2 to 5, Comparison Examples A to I

Using the same procedure as described in Example 1 other metal salts (in place of lanthanum chloride) were reacted with aluminium oxide/hydroxide. The metal salts used (all in a quantity of 2.2 mole percent relative to $Al_2O_3$) (available from Fluka Chemie AG, Buchs, Switzerland) are presented in Table 2. The amount of water in step a) was modified in such a way that the final weight was always 1000.04 g. Comparison example A does not contain a metal salt.

TABLE 2

| Example No. | Metal salt |
|---|---|
| 2 | $CeCl_3 \times 7\ H_2O$ |
| 3 | $NdCl_3 \times 6\ H_2O$ |
| 4 | $Pr(NO_3)_3 \times 5\ H_2O$ |
| 5 | $Yb(NO_3)_3 \times 5\ H_2O$ |
| A | — |
| B | $LiNO_3$ |
| C | $Ba(NO_3)_2$ |
| D | $SrCl_2$ |
| E | $TiCl_4$ |
| F | $SnCl_4$ |
| G | $HAuCl_4$ |
| H | CsCl |
| I | $Mg(NO_3)_2$ |

Results on image quality and dye bleeding are presented in Table 3.

TABLE 3

| Example No. | Image homogeneity | Dye bleeding |
|---|---|---|
| 1 | 5 | 5 |
| 2 | 8 | 5 |
| 3 | 9 | 4 |
| 4 | 9 | 4 |
| 5 | 7 | 5 |
| A | 14 | 4 |
| B | 19 | 4 |
| C | 22 | 4 |
| D | 27 | 3 |
| E | 15 | 5 |
| F | 14 | 4 |
| G | 39 | 3 |
| H | 39 | 2 |
| I | 18 | 4 |

Example 1 to 5 according to our invention containing aluminium oxide/hydroxide modified with salts of the rare earth metal series show a much better image homogeneity than comparison example A containing the unmodified aluminium oxide/hydroxide. Comparison examples B to I containing aluminium oxide/hydroxide modified with other metal salts show a strong degradation of image homogeneity in comparison to example A containing unmodified aluminium oxide/hydroxide.

Examples 1 (La), 2 (Ce) and 5 (Yb) show a considerable improvement in dye bleeding in comparison to example A containing unmodified aluminium oxide/hydroxide. Some of the comparison examples also show an improvement in dye bleeding. This is coupled, however, with a strong degradation of image homogeneity as can clearly be seen from the results in Table 3.

Only the recording sheets according to our invention show an improvement in image homogeneity and in dye bleeding.

Examples 6 to 12

Variable amounts of lanthanum chloride were reacted with aluminium oxide/hydroxide in a similar way as described in example 1. The amounts used are presented in Table 4. The amount of water in step a) was modified in such a way that the final weight was always 1000.04 g. Lanthanum nitrate instead of lanthanum chloride was used in example 12.

TABLE 4

| Example No. | Quantity (mole percent) |
|---|---|
| 6 | 0.21 |
| 7 | 0.66 |
| 8 | 1.12 |
| 9 | 2.20 |
| 10 | 2.66 |
| 11 | 3.32 |
| 12 | 2.20 |

Results on image homogeneity and dye bleeding of these examples are presented in Table 5.

TABLE 5

| Example No. | Image homogeneity | Dye bleeding |
|---|---|---|
| 6 | 13 | 4 |
| 7 | 13 | 5 |
| 8 | 5 | 5 |
| 9 | 5 | 5 |
| 10 | 9 | 4 |
| 11 | 10 | 3 |
| 12 | 5 | 5 |

Best results are obtained with a quantity of lanthanum salts between 1.12 and 2.20 mole percent relative to $Al_2O_3$ as can be seen immediately from the results in Table 5 (examples 8 and 9). Higher quantities of lanthanum show a reduced improvement in image homogeneity and dye bleeding (examples 10 and 11). The improvement is independent of the counter ion (anion) of the lanthanum salt used (examples 9 and 12).

Example 13, Comparison Example J

The colloidal solution AS-3 of aluminium oxide/hydroxide (7.55 weight percent $Al_2O_3$, available from NISSHO IWAI Deutschland GmbH, Düsseldorf, Germany) was used in place of DISPERAL 100/2 of example 1. It was dried in vacuum at a temperature of 40° C. before the modification step. Comparison example J and comparison example A differ in the same manner.

The results for image homogeneity and dye bleeding of these examples are presented in Table 6.

TABLE 6

| Example No. | Image homogeneity | Dye bleeding |
|---|---|---|
| 13 | 13 | 5 |
| J | 18 | 1 |

Image homogeneity and dye bleeding are considerably improved by using the dried form of the aluminium oxide/hydroxide AS-3 modified with lanthanum chloride as can be seen immediately from the results in Table 6.

What is claimed is:

1. A recording sheet for ink jet printing comprising a support having coated onto said support at least one ink receiving layer containing at least one binder and a porous aluminium oxide/hydroxide, said recording sheet being characterised in that the porous aluminium oxide/hydroxide comprises at least one element of the rare earth metal series of the periodic system of the elements with atomic numbers 57 to 71.

2. A recording sheet according to claim 1 wherein the total mole percent of said rare earth metal elements is from 0.04 to 4.2 mole percent relative to $Al_2O_3$.

3. A recording sheet according to claim 1 wherein the total mole percent of said rare earth metal elements is from 0.04 to 2.5 mole percent relative to $Al_2O_3$.

4. A recording sheet according to claim 1 characterised in that the porous aluminium oxide/hydroxide comprises the elements lanthanum, ytterbium, praseodymium, cerium or neodymium or mixtures thereof.

5. A recording sheet according to claim 1 characterised in that the porous aluminium oxide/hydroxide comprises the elements lanthanum and/or cerium and/or ytterbium.

6. A recording sheet according to claim 1 characterised in that the porous aluminium oxide/hydroxide is pseudo-bohemite.

7. A recording sheet according to claim 1 characterised in that said at least one binder is film forming.

8. A recording sheet according to claim 7 characterised in that said at least one binder is gelatine and/or polyvinyl alcohol.

9. A recording sheet according to claim 1 characterised in that said at least one binder is crosslinked.

10. A recording sheet according to claim 1 characterised in that the recording sheet comprises at least one additional layer which does not include said porous aluminium oxide/hydroxide.

11. Coating compositions for the preparation of ink receiving layers for recording sheets for ink jet printing comprising at least one binder, and a porous aluminum oxide/hydroxide, wherein said porous aluminum oxide/hydroxide comprises at least one element of the rare earth metal series of the periodic system of the elements with atomic numbers 57 to 71.

* * * * *